(12) United States Patent
O'Sullivan et al.

(10) Patent No.: US 8,300,791 B2
(45) Date of Patent: Oct. 30, 2012

(54) INHIBITION OF TELEPHONY BASED PHISHING

(75) Inventors: Patrick J. O'Sullivan, Dublin (IE);
Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 11/935,520

(22) Filed: Nov. 6, 2007

(65) Prior Publication Data
US 2009/0116630 A1 May 7, 2009

(51) Int. Cl.
*H04M 3/42* (2006.01)
(52) U.S. Cl. ............................ 379/207.13; 379/210.02
(58) Field of Classification Search ............. 379/210.02, 379/207.13, 355.02
See application file for complete search history.

(56) References Cited

U.S. PATENT DOCUMENTS

| | | | | |
|---|---|---|---|---|
| 4,598,179 A | * | 7/1986 | Clark et al. | 379/200 |
| 6,483,910 B1 | * | 11/2002 | Council | 379/127.01 |
| 2003/0118175 A1 | * | 6/2003 | Hariri et al. | 379/355.02 |
| 2009/0110174 A1 | * | 4/2009 | Gallant et al. | 379/210.02 |

* cited by examiner

*Primary Examiner* — Rasha Al Aubaidi
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to telephonic phishing and provide a method, system and computer program product for preventing telephonic phishing. In an embodiment of the invention, a method for preventing telephonic phishing can be provided. The method can include receiving in a third-party validation service a request by an enterprise caller to establish a telephone call with a customer, validating the enterprise caller in the third-party validation service, and notifying the customer of whether or not the enterprise caller is legitimate or illegitimate.

19 Claims, 2 Drawing Sheets

INHIBITION OF TELEPHONY BASED PHISHING

BACKGROUND OF THE INVENTION

1. Field of the Invention

The present invention relates to the field of telephonic fraud prevention and more particularly to the prevention of telephonic phishing.

2. Description of the Related Art

The terms "phishing" and "brand spoofing" refer to the transmission of an e-mail to a user falsely claiming to be an established legitimate enterprise in an attempt to scam the user into surrendering private information that will be used for identity theft. In a phishing scam, an e-mail appearing to originate from the legitimate enterprise (whether by the inclusion of a well-known icon or logo, or domain name) directs the user to visit a Web site where the users will be asked to update personal information, such as a password, credit card number, social security number, or bank account number. The Web site, however, merely is an imposter site masquerading for the legitimate Web site for the legitimate enterprise. For the unsuspecting user, valuable confidential information will be revealed to the fraudster.

Government experts and technical experts alike recommend vigilance as a prime means of combatting the phishing scheme. Specifically, experts recommend that end users never reveal private information through a Web site in response to receiving an e-mail requesting the private information, no matter how legitimate the e-mail appears. Rather, experts encourage recipients of such e-mails to directly phone the legitimate enterprise through a previously known telephone number to inquire as to the legitimacy of the e-mail. Even still, many users simply lapse in caution and unwittingly participate as victims in the phishing scam.

Phishing relies not only upon e-mail, but also telephony. In this regard, phishing scammers have been known to send an e-mail that appears to be from a legitimate business requesting to the recipient to call a phone number to update account information or to access a "refund." Because the scammer can utilize Voice over Internet Protocol (VoIP) technology, the area code and phone number reflected in the e-mail does not reflect the true location of the phishing scammer. As in the case of pure e-mail phishing, experts recommend that the recipient of a suspicious e-mail call the telephone number on a recent financial statement or on the back of a referenced credit card to contact the legitimate enterprise in order to inquire as to the legitimacy of the e-mail.

Telephonic phishing is a form of phishing in which the scam originates and concludes exclusively through the use of a telephone connection between scammer and victim. In the telephonic phishing scheme, a caller purports to represent a legitimate enterprise in requesting confidential information from the victim. The scammer masquerades as the legitimate enterprise by tampering with the caller identification (ID) data in the call header for the telephone call. Alternatively, the scammer associates a telephone number with a business or personal name that when truncated in a caller ID display appears to be similar to the legitimate enterprise, for example, "Amer" as a last name to be intentionally confused with "American Express".

BRIEF SUMMARY OF THE INVENTION

Embodiments of the present invention address deficiencies of the art in respect to telephonic phishing and provide a novel and non-obvious method, system and computer program product for preventing telephonic phishing. In an embodiment of the invention, a method for preventing telephonic phishing can be provided. The method can include receiving in a third-party validation service a request by an enterprise caller to establish a telephone call with a customer, validating the enterprise caller in the third-party validation service, and notifying the customer of whether or not the enterprise caller is legitimate or illegitimate.

In one aspect of the embodiment, notifying the customer of whether or not the enterprise caller is legitimate or illegitimate, can include bridging a telephone call between the enterprise caller and the customer if the enterprise caller validates legitimate. In another aspect of the embodiment, notifying the customer of whether or not the enterprise caller is legitimate or illegitimate, can include indicating to a local exchange carrier whether or not the enterprise caller is legitimate relative to the customer so that the local exchange carrier upon detecting a call between the enterprise caller and customer provides an audible indication of whether or not the enterprise caller is legitimate. Alternatively, the validation service can directly notify the customer of whether or not the enterprise caller is legitimate or illegitimate by providing an audible indication of whether or not the enterprise caller is legitimate.

In a further aspect of the embodiment, notifying the customer of whether or not the enterprise caller is legitimate or illegitimate, can include providing a text message to the customer of whether or not the enterprise caller is legitimate or illegimate. In yet a further aspect of the embodiment, notifying the customer of whether or not the enterprise caller is legitimate or illegitimate, can include providing a legitimate phone number for the enterprise caller. Finally, in even yet a further aspect of the embodiment, providing an audible indication of whether or not the enterprise caller is legitimate can include providing an audible indication of whether or not the enterprise caller is legitimate in response to detecting a predetermined set of dial tones from a telephone keypad.

In another embodiment of the invention, a validation data processing system can be configured for preventing telephonic phishing. The system as configured can include a validation service executing in a host server and an enterprise caller coupled to the validation service over a public switched telephone network (PSTN). The system further can include anti-phishing logic coupled to the validation service. The logic can include program code enabled to receive a request by the enterprise caller to establish a telephone call with a customer, to validate the enterprise caller and to provide notice to the customer of whether or not the enterprise caller is legitimate or illegitimate. Optionally, the validation service can be disposed in a local exchange carrier in the PSTN.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being precise arrangements and instrumentalities shown, wherein.

DETAILED DESCRIPTION OF THE INVENTION

Embodiments of the present invention provide a method, system and computer program product for preventing telephonic phishing. In accordance with an embodiment of the present invention, a third-party validation service can validate an enterprise seeking to telephonically contact a customer. In response to validating the enterprise, the third-party validation service can provide the customer with an assurance that the enterprise is legitimate. For example, the third-party validation service can provide notice telephonically or by text messaging to the customer of the legitimacy of the enterprise prior to or concurrently with the placement of a call between the enterprise and the customer.

Optionally, upon validating the enterprise, the third-party validation service can bridge the call between the enterprise and customer. As another option, the third-party validation service can certify the legitimacy of the enterprise to a local exchange carrier for the customer such that the customer can query the local exchange carrier to determine the legitimacy of the enterprise during a call between the enterprise and the customer. As yet a further option, subsequent to validating the enterprise, the third-party validation service can provide legitimate contact information for the enterprise when requested by the customer.

Figure 1:
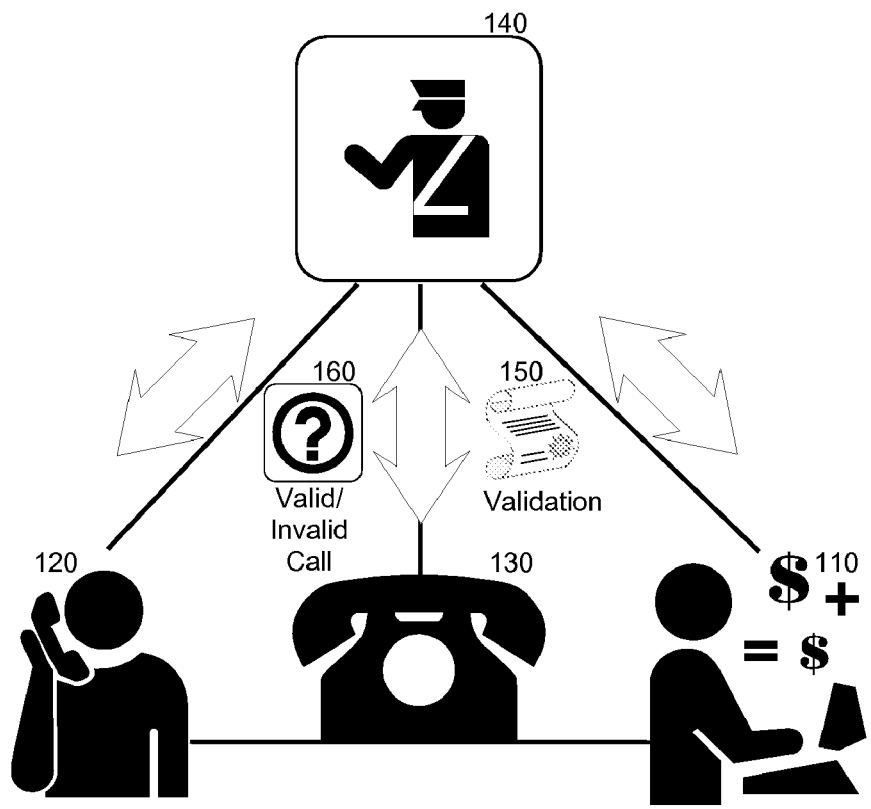
FIG. 1 is a pictorial illustration of a process for preventing telephonic phishing.

In further illustration, FIG. 1 is a pictorial illustration of a process for preventing telephonic phishing. As shown in FIG. 1, a validation service 140 can be communicatively coupled to each of an enterprise caller 110 and a customer 120. The enterprise caller 110 can include an originating caller seeking to establish a commercial telephone call with the customer 120 over a telecommunications network 130. Prior to initiating the telephone call, the enterprise caller 110 can validate the legitimacy of the enterprise caller 110 with the validation service 140. Thereafter, either before or during a telephone call between the enterprise caller 110 and the customer 120, the validation service 140 can provide an indication 160 of the legitimacy or illegitimacy of the enterprise caller 110.

For example, the validation service 140 can issue a certificate 150 to the telecommunications network 130 indicating the legitimacy of the enterprise caller 110. Thereafter, when detecting a call between the enterprise caller 110 and the customer 120, the telecommunications network 130 can provide an audible form of the indication 160. Alternatively, once the call has been completed between the enterprise caller 110 and the customer 120, at the request of the customer 120 for example in response to the receipt of a specified set of dial tones by the customer 120, the telecommunications network 130 can provide the indication 160.

As yet another alternative, the validation service 140 can provide the indication 160 directly to the customer 120 in the form of a phone call or text message. As even yet another alternative, the validation service 140 can permit the customer 120 to retrieve the indication 160 from the validation service 140 either electronically through a Web site provided by the validation service 140 or telephonically in an automated voice response system. As a final alternative, the validation service 140 upon validating the legitimacy of the enterprise caller 110 can bridge a call between the enterprise caller 110 and the customer 120. In all circumstances, an attempt at telephonic phishing can be thwarted.

Figure 2:
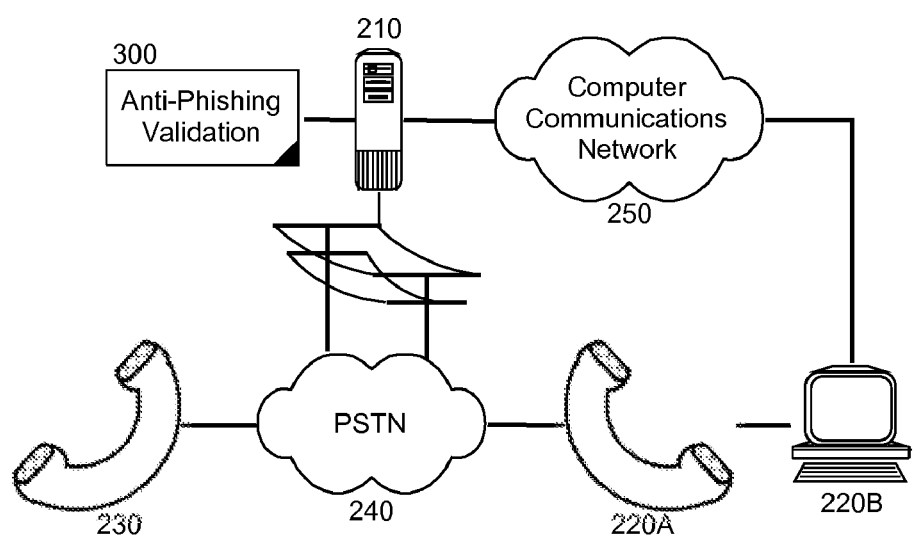
FIG. 2 is a schematic illustration of a validation data processing system configured for preventing telephonic phishing; and, FIGS. 3A through 3C, taken together, are a flow chart illustrating a process for preventing telephonic phishing.

In further illustration, FIG. 2 schematically depicts a validation data processing system configured for preventing telephonic phishing. The system can include a host validation server 210 configured to be telephonically coupled to both an enterprise caller 220A and a customer 230 over a public switched telephone network 240. Optionally, the host validation server 210 further can be configured to be communicatively coupled to a computing client 220B of the enterprise caller 220A over computer communications network 250 such that the enterprise caller 220A can be validated through a Web interface provided by the host validation server 210 and rendered in a content browser in the computing client 220B.

Notably, anti-phishing validation logic 300 can be coupled to the host validation server 210. The logic 300 can include program code enabled to validate the legitimacy of the enterprise caller 220A, for example by verifying a pre-established user name and password, corporate phone number, corporate address, one or more corporate officer identities, stock symbol, employer identification number (EIN) or any other information personal to the enterprise caller 220A sufficient to confirm the identity of the enterprise caller 220A. Methods for verifying the identity of a party are well-known in the art and are particularly practiced in the field of digital certificate issuance by a certificate authority.

The program code of the logic 300 further can be enabled upon verifying the enterprise caller 220A to provide notice to a designated customer 230 of the legitimacy of the enterprise caller 220A. For example, the program code of the logic 300 can be enabled to bridge a call between the enterprise caller 220A and the customer 230 or to certify to the PSTN 240 the legitimacy of the enterprise caller 220A such that on demand a local exchange carrier within the PSTN 240 can provide an audible indication of the legitimacy of the enterprise caller 220A to the customer prior to or during a call between the enterprise caller 220A and the customer 230. Optionally, the program code of the logic 300 can be enabled to forward an indication of the legitimacy of the enterprise caller 220A to the customer 230 by way of telephone or text message. Yet further, the program code of the logic 300 can be enabled to provide an indication of the legitimacy of the enterprise caller 220A to the customer 230 at the request of the customer 230.

Figure 3A:
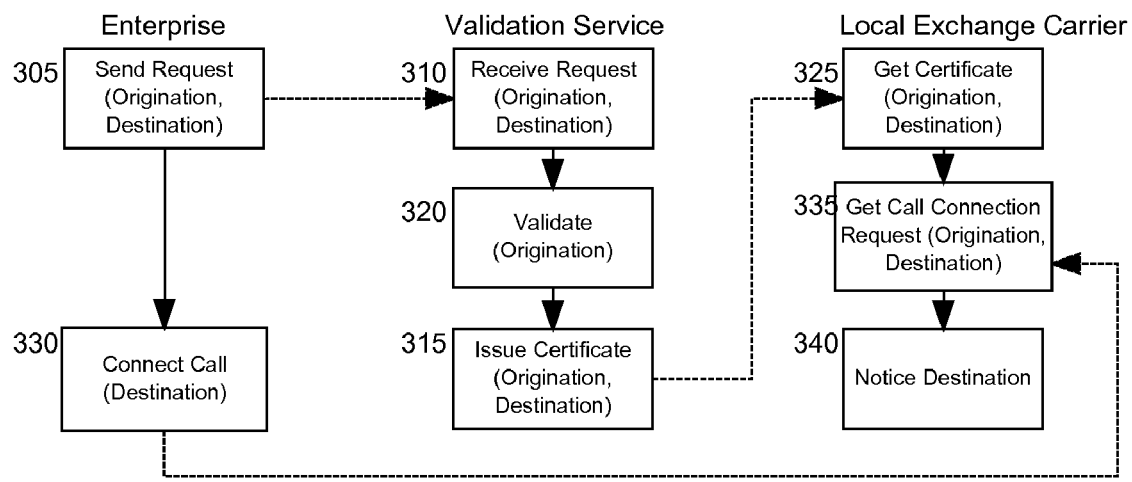
Figure 3B:
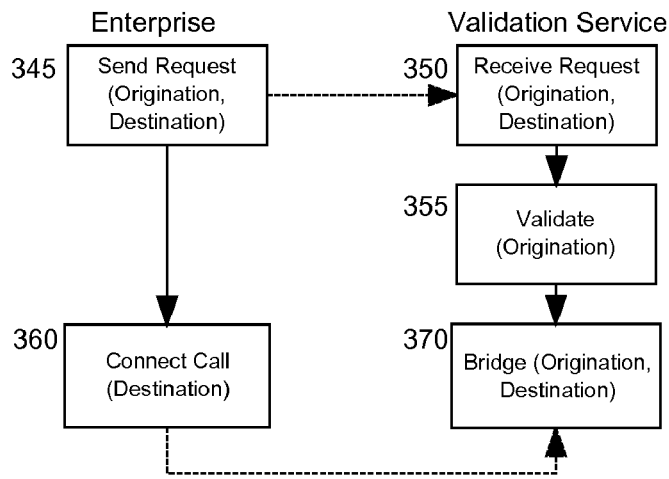

As it will be apparent to the skilled artisan, the program code of the logic 300 can be enabled to provide an indication of the legitimacy of the enterprise caller 220A in any number of ways with or without the cooperation of the PSTN 240. In illustration, FIGS. 3A through 3C, taken together, are a flow chart illustrating a process for preventing telephonic phishing. For instance, FIG. 3A demonstrates validation in cooperation with the PSTN. Beginning in block 305 of FIG. 3A, the enterprise caller can send a request to the validation service including both an identifier of the enterprise caller as an origination and also an identifier of the customer as a destination. Notably, the validation service can be separate from the PSTN, or incorporated into the PSTN as a service provided by the local exchange carrier.

In block 310, the request can be received by the validation service and in block 320 the enterprise caller identified by an originating number can be validated. If it is determined that the enterprise caller is legitimate, in block 315 a certificate can be issued to the local exchange carrier in the PSTN for the combination of originating number and destination number. Thereafter, in block 325 the certificate can be received in the local exchange carrier and a call connection request can be received to connect the enterprise caller with the customer in block 335 in consequence of the enterprise caller attempting to connect to the destination in block 330. Finally, in block 340 the local exchange carrier can notice the legitimacy (or illegitimacy) of the enterprise caller to the customer over the connected call either automatically at the outset of the call, or on demand in response to the customer keying a request through the telephone keypad.

It is to be noted that the cooperation of the PSTN is not required. In this regard, referring to FIG. 3B, in block 345 a request can be sent by the enterprise caller to the validation service to validate a proposed call between the enterprise caller and the customer. In block 350 the request can be received in the validation service and the enterprise caller can be validated as legitimate (or illegitimate as the case may be) in block 355. In block 360, the enterprise caller can initiate a call with the customer through the validation service which in turn can bridge a call to the customer presuming that the enterprise caller has been validated as legitimate.

Figure 3C:
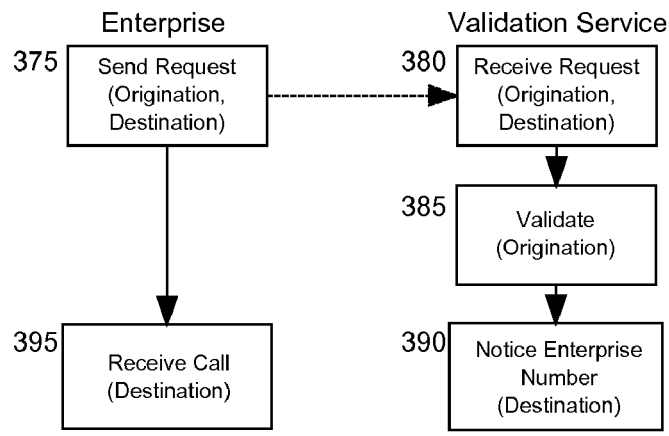

To the extent that the customer has a proactive, trusted and known relationship with the validation service, the validation service can provide an indication of the legitimacy or illegitimacy of the enterprise caller passively in response to a query provided by the customer. In particular, as shown in FIG. 3C, in block 375 a request can be forwarded by the enterprise caller to connect a call with the customer. In block 380 the request can be received by the validation service and the legitimacy or illegitimacy of the enterprise caller can be determined in block 385. Thereafter, in block 390 notice of the legitimacy or illegitimacy of the enterprise caller can be provided to the customer either proactively through a text message or telephone call, or passively by allowing the customer to contact the validation service by telephone or Web site. Specifically, a legitimate phone number for the enterprise caller can be provided to the customer whose subsequent phone call can be received by the enterprise caller in block 395.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for preventing telephonic phishing, the method comprising:
    receiving in a third-party validation service a request by an enterprise caller to establish a telephone call with a customer;
    validating the enterprise caller in the third-party validation service; and,
    notifying the customer of whether or not the enterprise caller is legitimate or illegitimate.

2. The method of claim 1, wherein notifying the customer of whether or not the enterprise caller is legitimate or illegitimate, comprises bridging a telephone call between the enterprise caller and the customer if the enterprise caller validates legitimate.

3. The method of claim 1, wherein notifying the customer of whether or not the enterprise caller is legitimate or illegitimate, comprises indicating to a local exchange carrier whether or not the enterprise caller is legitimate relative to the customer so that the local exchange carrier upon detecting a call between the enterprise caller and customer provides an audible indication of whether or not the enterprise caller is legitimate.

4. The method of claim 1, wherein notifying the customer of whether or not the enterprise caller is legitimate or illegitimate, comprises upon detecting a call between the enterprise caller and customer providing an audible indication of whether or not the enterprise caller is legitimate.

5. The method of claim 4, wherein providing an audible indication of whether or not the enterprise caller is legitimate, comprises providing an audible indication of whether or not the enterprise caller is legitimate in response to detecting a pre-determined set of dial tones from a telephone keypad.

6. The method of claim 1, wherein notifying the customer of whether or not the enterprise caller is legitimate or illegitimate, comprises providing a text message to the customer of whether or not the enterprise caller is legitimate or illegitimate.

7. The method of claim 1, wherein notifying the customer of whether or not the enterprise caller is legitimate or illegitimate, comprises providing a legitimate phone number for the enterprise caller.

8. A validation data processing system configured for preventing telephonic phishing, the system comprising:
    a validation service executing in a host server;
    an enterprise caller coupled to the validation service over a public switched telephone network (PSTN); and,
    anti-phishing logic coupled to the validation service, the logic comprising program code enabled to receive a request by the enterprise caller to establish a telephone call with a customer, to validate the enterprise caller and to provide notice to the customer of whether or not the enterprise caller is legitimate or illegitimate.

9. The system of claim 8, wherein the validation service is disposed in a local exchange carrier in the PSTN.

10. The system of claim 8, wherein the notice is a text message to the customer.

11. The system of claim 8, wherein the notice is an audible message played upon connecting a call between the enterprise caller and the customer.

12. The system of claim 8, wherein the notice is an audible message played in response to receiving a pre-determined sequence of dial tones from the customer.

13. A computer program product comprising a computer usable storage medium embodying computer usable program code for preventing telephonic phishing, the computer program product comprising:

computer usable program code for receiving in a third-party validation service a request by an enterprise caller to establish a telephone call with a customer;

computer usable program code for validating the enterprise caller in the third-party validation service; and, computer usable program code for notifying the customer of whether or not the enterprise caller is legitimate or illegitimate.

14. The computer program product of claim 13, wherein the computer usable program code for notifying the customer of whether or not the enterprise caller is legitimate or illegitimate, comprises computer usable program code for bridging a telephone call between the enterprise caller and the customer if the enterprise caller validates legitimate.

15. The computer program product of claim 13, wherein the computer usable program code for notifying the customer of whether or not the enterprise caller is legitimate or illegitimate, comprises computer usable program code for indicating to a local exchange carrier whether or not the enterprise caller is legitimate relative to the customer so that the local exchange carrier upon detecting a call between the enterprise caller and customer provides an audible indication of whether or not the enterprise caller is legitimate.

16. The computer program product of claim 13, wherein the computer usable program code for notifying the customer of whether or not the enterprise caller is legitimate or illegitimate, comprises computer usable program code for upon detecting a call between the enterprise caller and customer providing an audible indication of whether or not the enterprise caller is legitimate.

17. The computer program product of claim 16, wherein the computer usable program code for providing an audible indication of whether or not the enterprise caller is legitimate, comprises computer usable program code for providing an audible indication of whether or not the enterprise caller is legitimate in response to detecting a pre-determined set of dial tones from a telephone keypad.

18. The computer program product of claim 13, wherein the computer usable program code for notifying the customer of whether or not the enterprise caller is legitimate or illegitimate, comprises computer usable program code for providing a text message to the customer of whether or not the enterprise caller is legitimate or illegitimate.

19. The computer program product of claim 13, wherein the computer usable program code for notifying the customer of whether or not the enterprise caller is legitimate or illegitimate, comprises computer usable program code for providing a legitimate phone number for the enterprise caller.

* * * * *